United States Patent [19]
Osborn et al.

[11] Patent Number: 6,119,022
[45] Date of Patent: Sep. 12, 2000

[54] SYSTEM FOR ALERTING PORTABLE COMMUNICATION DEVICE USER OF INCOMING CALL

[75] Inventors: William Richard Osborn, Cary; David Rand Irvin, Raleigh, both of N.C.

[73] Assignee: Ericsson Inc., Research Triangle Park, N.C.

[21] Appl. No.: 08/819,787

[22] Filed: Mar. 18, 1997

[51] Int. Cl.[7] .................................................. H04B 1/38
[52] U.S. Cl. ............................ 455/567; 455/88; 455/575
[58] Field of Search .................................... 455/11.1, 413, 455/66, 550, 88, 73, 556–559, 563, 566–567, 575, 90, 128, 344, 351, 31.1, 32.1, 38.4, 38.5, 38.1–38.2, 79; 340/311.1; 379/52

[56] References Cited

U.S. PATENT DOCUMENTS

| | | | |
|---|---|---|---|
| 4,803,487 | 2/1989 | Williard et al. | 455/11.1 |
| 4,860,335 | 8/1989 | Namekawa . | |
| 4,906,989 | 3/1990 | Kasugai | 455/31.2 |
| 5,566,224 | 10/1996 | Ul Azam et al. | 455/566 |
| 5,590,417 | 12/1996 | Rydbeck | 455/90 |
| 5,689,822 | 11/1997 | Zucker | 455/351 |
| 5,722,071 | 2/1998 | Berg et al. | 455/567 |
| 5,867,796 | 2/1999 | Inutsuka | 455/11.1 |

FOREIGN PATENT DOCUMENTS

| | | |
|---|---|---|
| 0 467 071 | 1/1992 | European Pat. Off. . |
| 0 590 500 | 4/1994 | European Pat. Off. . |
| 0 740 449 | 10/1996 | European Pat. Off. . |
| 0 746 131 | 12/1996 | European Pat. Off. . |
| 195 27 792 | 1/1997 | Germany . |
| WO 96 12378 | 4/1996 | WIPO . |

*Primary Examiner*—Doris H. To
*Attorney, Agent, or Firm*—Davidson & Gribbell, LLP

[57] ABSTRACT

An incoming call alert system for use with a portable communication device is disclosed as including an accessory unit physically separate from the portable communication device for providing an alerting signal, a wireless link between the portable communication device and the accessory unit, and circuitry electrically connected to operating circuitry of the portable communication device for providing a message exclusively to the accessory unit over the wireless link when an incoming call is received by the portable communication device, the message causing the accessory unit to activate the alerting signal. The circuitry further includes an interface for maintaining and terminating the electrical connection between the circuitry and the operating circuitry of the portable communication device, a transceiver for transmitting messages exclusively to and receiving messages exclusively from the accessory unit over the wireless link, and control logic for monitoring receipt of an incoming call by the portable communication device and activating the transceiver to transmit the message in response thereto. The accessory unit further includes a power source, a transceiver for receiving messages exclusively from and transmitting messages exclusively to the circuitry over the wireless link, a transducer which provides the alerting signal upon activation, and control circuitry for activating the transducer upon receipt of the message by the receiver via the wireless link.

28 Claims, 4 Drawing Sheets

SYSTEM FOR ALERTING PORTABLE COMMUNICATION DEVICE USER OF INCOMING CALL

BACKGROUND OF THE INVENTION

1. Field of the Invention

The present invention relates generally to alerting users of portable communication devices of incoming calls and, more particularly, to a system for alerting a user of a portable communication device of an incoming call by means of a separate accessory unit which is linked exclusively with such portable communication device.

2. Description of Related Art

Tactile alarm systems are well known in the art for gaining the attention of an individual without use of sound or light. Such systems have been utilized with doorbells for the deaf/blind (e.g., U.S. Pat. No. 4,731,603 to McRae et al.) and telephones (e.g., U.S. Pat. No. 4,421,953 to Zielinski), for example. These alarm systems typically include a transmitter for transmitting a signal to a receiving unit which is usually worn by the individual, whereupon the receiving unit vibrates or otherwise provides an alerting signal that someone is at the door or an incoming call is received. While the aforementioned tactile alarm systems are useful for their intended purpose, it will be noted that they are limited to a certain location by the physical constraints thereof In the case of portable communication devices, the alarm system must have the ability to travel with the user. This problem has been solved in part by U.S. Pat. No. 5,404,391 to Wavroch et al., where an incoming call alert system is disclosed for cellular telephones. It will be seen therein that such alert system is physically separate from and not wired to the cellular telephone with which it is used. More specifically, the Wavroch et al. system is tuned to receive a carrier signal which is transmitted by the cellular phone on a voice channel frequency upon receipt of a paging signal. The carrier signal is then used to activate a trigger means and an alert means connected thereto. It has been found, however, that when any transmitter transmits at a frequency in the voice channel frequency band, in frequencies close to this band, or in harmonics of frequencies in this band, false alerts will occur. This can be a constant source of frustration for the user of the cellular telephone, particularly in an environment where several other cellular phones are present.

Accordingly, it is a primary object of the present invention to provide an alerting system for use with a portable communication device which is linked exclusively to such portable communication device.

It is another object of the present invention to provide an alerting system for use with a portable communication device in which an accessory unit physically separate from the portable communication device provides an alerting signal upon receipt of an incoming call by the portable communication device.

It is still another object of the present invention to provide an alerting system for use with a portable communication device in which an accessory unit physically separate from the portable communication device has a wireless link with such portable communication device.

Yet another object of the present invention is to provide an alerting system for use with a portable communication device which is able to display information identifying the source of an incoming call to the portable communication device.

Still another object of the present invention is to provide an alerting system for use with a portable communication device which automatically determines whether an incoming call to the portable communication device is to be dispatched to a voice mailbox, answered, or left unanswered.

A further object of the present invention is to provide an alerting system for use with a portable communication device where an alerting signal provided by the portable communication device is automatically or optionally disabled when the alerting system is powered on.

These objects and other features of the present invention will become more readily apparent upon reference to the following description when taken in conjunction with the following drawing.

SUMMARY OF THE INVENTION

In accordance with one aspect of the present invention, an incoming call alert system for use with a portable communication device is disclosed as including an accessory unit physically separate from the portable communication device for providing an alerting signal, a wireless link between the portable communication device and the accessory unit, and circuitry electrically connected to operating circuitry of the portable communication device for providing a message exclusively to the accessory unit over the wireless link when an incoming call is received by the portable communication device, the message causing the accessory unit to activate the alerting signal. The circuitry further includes an interface for maintaining and terminating the electrical connection between the circuitry and the operating circuitry of the portable communication device, a transceiver for transmitting messages exclusively to and receiving messages exclusively from the accessory unit over the wireless link, and control logic for monitoring receipt of an incoming call by the portable communication device and activating the transceiver to transmit the message in response thereto. The accessory unit further includes a power source, a transceiver for receiving messages exclusively from and transmitting messages exclusively to the circuitry over the wireless link, a transducer which provides the alerting signal upon activation, and control circuitry for activating the transducer upon receipt of the message by the accessory unit transceiver via the wireless link.

In accordance with a second aspect of the present invention, an incoming call alert system for use with a cellular telephone is disclosed as including a first unit electrically connected to a system-bus connector of the cellular phone and a second unit located within a housing physically separate from the cellular telephone. The first unit includes an interface for maintaining and terminating the electrical connection between the first unit and the system-bus connector of the cellular telephone, a transceiver for transmitting and receiving messages over a wireless link exclusively to and from the second unit, and control logic for monitoring receipt of an incoming call by the cellular telephone and activating the transceiver to transmit a ring command message in response thereto. The second unit further includes a power source, a transceiver for receiving and transmitting messages from and to the first unit over the wireless link, a transducer which provides the alerting signal upon activation, and control circuitry for activating the transducer upon receipt of the ring command message from the first unit transceiver via the wireless link.

In accordance with a third aspect of the present invention, an accessory unit for use with a portable communication device is disclosed as including a power source, a wireless link with the portable communication device, a receiver for receiving a ring command message specifically addressed to the accessory unit from the portable communication device over the wireless link, a transducer for providing an alerting signal, and control circuitry for activating the transducer upon receipt of the ring command message by the receiver. The accessory unit further may include a transmitter for transmitting messages specifically addressed to the portable communication device via the wireless link. The accessory unit may also include a signaling switch for activating a voice response unit to play a prerecorded message, as well as a display to show information identifying a source of an incoming call to the portable communication device.

In accordance with a fourth aspect of the present invention, an expansion unit for signaling an accessory unit via a wireless link when a portable communication device receives an incoming call is disclosed as including circuitry electrically connected to operating circuitry of the portable communication device, an interface for maintaining and terminating the electrical connection between the circuitry and the operating circuitry of the portable communication device, a transmitter for transmitting a ring command message exclusively to the accessory unit over the wireless link, and control logic for monitoring receipt of an incoming call by the portable communication device and activating the transmitter to transmit the ring command message in response thereto. The expansion unit may further include a receiver for receiving messages exclusively from the accessory unit via the wireless link, as well as a voice response unit for playing a prerecorded message upon activation by a message from the accessory unit.

In accordance with a fifth aspect of the present invention, a battery pack for powering a portable communication device is disclosed as including a power source with at least one terminal for connecting the battery pack to operating circuitry of the portable communication device and circuitry for signaling an accessory unit via a wireless link when the portable communication device receives an incoming call, where the circuitry is electrically connected to operating circuitry of the portable communication device by means of at least one terminal. The circuitry further includes an interface for maintaining and terminating the electrical connection between the circuitry and the operating circuitry of the portable communication device, a transmitter for transmitting a ring command message exclusively to the accessory unit over the wireless link, and control logic for monitoring receipt of an incoming call by the portable communication device and activating the transmitter to transmit the ring command message in response thereto. The circuitry further may include a receiver for receiving messages exclusively from the accessory unit via the wireless link, as well as a voice response unit for playing a prerecorded message upon activation by a message from the accessory unit.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
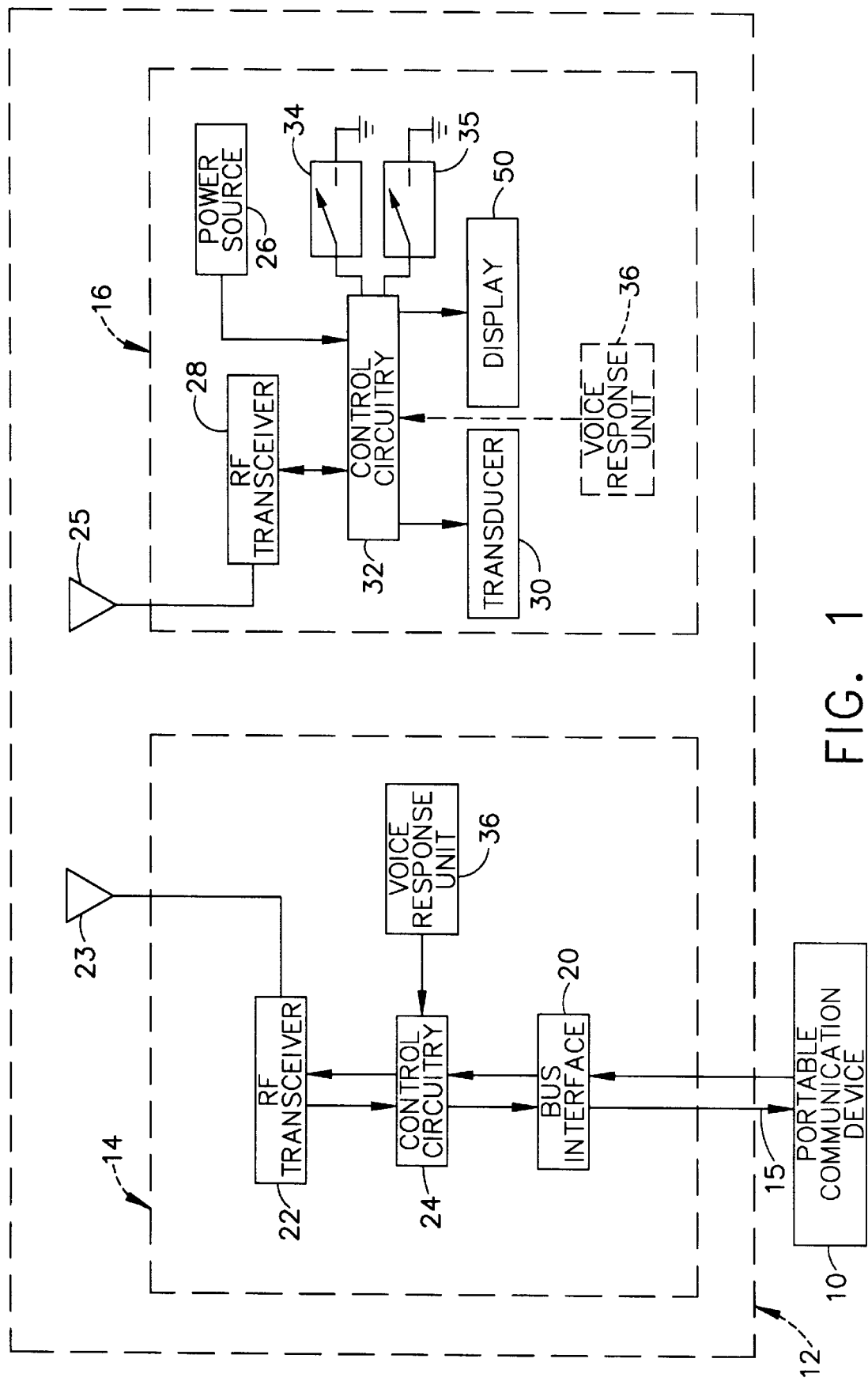
FIG. 1 is a schematic block diagram of a portable communication device and an alerting system for use therewith in accordance with the present invention.

Referring now to the drawing in detail, wherein identical numerals indicate the same elements throughout the figures, FIG. 1 depicts schematically a portable communication device 10 and an incoming call alert system 12 for use therewith. While portable communication device 10 will be shown and described herein as a cellular telephone, it will be understood that this is only for exemplary purposes and it may be any kind of portable communication device such as a radio terminal, a personal communication system terminal, a satellite telephone, a pager, a cordless telephone, a portable computer with a PCMCIA card, and a wireless-PBX terminal Further, the present invention is applicable to data communication and multimedia communication terminals for which a request to begin a session is equivalent to the arrival of an incoming call.

It will be seen that alerting system 12 includes a first unit 14 which is electrically connected to the operating circuitry of portable communication device 10 (e.g., by a short cable to the system-bus connector of a cellular telephone) and a second or accessory unit 16 which is physically separate from both portable communication device 10 and first unit 14. First unit 14 may take the form of an expansion unit which is separately attachable to and detachable from portable communication device 10 (e.g., the belt clip of a cellular telephone). Alternatively, first unit 14 may be incorporated into a battery pack 18 used to power portable communication device 10 (see FIG. 2) or directly into the operating circuitry of portable communication device 10 (not shown). In any case, first unit 14 enables portable communication device 10 to operate accessory unit 16.

More specifically, first unit 14 includes a bus interface 20 for maintaining and terminating the electrical connection between first unit 14 and the operating circuitry of portable communication device 10, a transceiver 22 for transmitting messages exclusively to and receiving messages exclusively from accessory unit 16 over a wireless link therebetween, and control circuitry 24 having logic for monitoring receipt of an incoming call by portable communication device 10 and activating transceiver 22 to transmit a ring command message to accessory unit 16 in response thereto. Control circuitry 24 further includes control logic for transceiver 22 so that messages transmitted to accessory unit 16 over the wireless link contain information within specified fields, which shall be discussed in greater detail herein.

Figure 2:
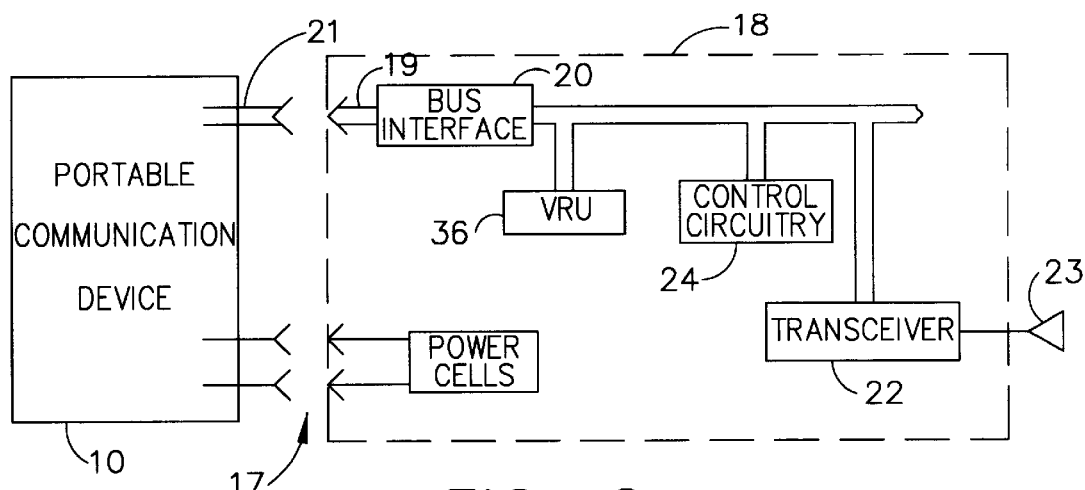
FIG. 2 is a schematic block diagram of an alternative embodiment for the circuitry of the alerting system electrically connected to the portable communication device.

As noted above, first unit 14 may be incorporated into a battery pack 18 for portable communication device 10 (shown schematically in FIG. 2). It will be seen therein that battery pack 18 provides power to portable communication device 10 through a standard terminal 17 (i.e., a pair of copper pins). Additionally, battery pack 18 would include a male system-bus connector 19 which is attachable to a female system-bus connector 21 located on the external surface of portable communication device 10. It will further be understood that the components of first unit 14 (bus interface 20, control circuitry 24, and transceiver 22) are connected to an extended system-bus and operate in the same manner as that described herein.

Figure 3:
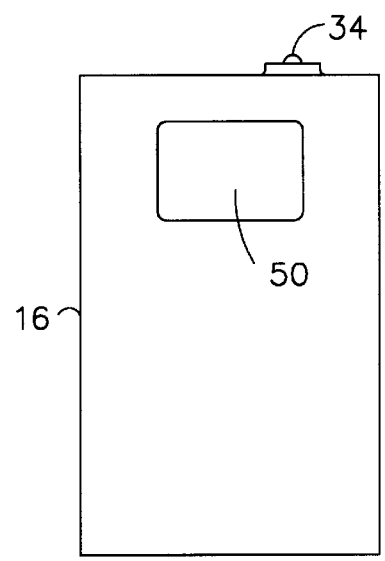
FIG. 3 is a schematic front view of the accessory unit of the alerting system depicted in FIG. 1.
Figure 4:
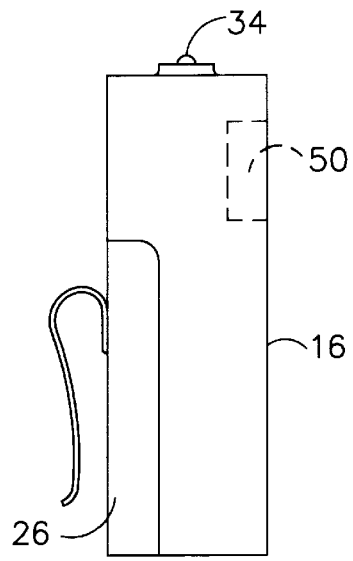
FIG. 4 is a schematic side view of the accessory unit of the alerting system depicted in FIG. 3.

Accessory unit 16, for its part, includes a power source 26 (e.g., a rechargeable battery), a transceiver 28 for receiving messages exclusively from and transmitting messages exclusively to first unit 14 over the wireless link, a transducer 30 which provides an alerting signal upon activation, and control circuitry 32 for activating transducer 30 upon receipt of a ring command message by transceiver 28 from first unit transceiver 22. Accessory unit 16 preferably includes a signaling switch 34 (see FIGS. 1, 3 and 4), the activation of which causes control circuitry 32 to transmit an answer message via transceiver 28 to first unit control circuitry 24 that preferably activates a voice response unit 36. (Of course, this may be an automatic response unit which instead provides a digital text message as in the case where portable communication device 10 is a data communication or multimedia communication terminal). Voice response unit 36 then plays a pre-recorded message which informs the caller that portable communication device 10 will be answered momentarily (i.e. "please stand by"). It will be understood that the pre-recorded message would be digitally encoded according to the compression method used by the native speech encoder of portable communication device 10 and stored in read-only memory (ROM). In the case of an analog portable communication device, the ROM is preloaded with band-limited speech which is read onto the analog channel of the system bus through a digital-to-analog converter. Voice response unit 36 may alternatively be located within accessory unit 16, whereupon activation of signaling switch 34 causes control circuitry 32 to activate such voice response unit 36 and send the pre-recorded message therein to first unit 14 via transceiver 28.

With respect to the messages transmitted and received between first unit 14 and accessory unit 16, transceivers 22 and 28 preferably utilize an RF link (e.g., approximately 2.0 GHz or greater) through antennas 23 and 25, respectively. The wireless transmission of messages between first and second units 14 and 16 may be performed in other ways, such as, for example, by magnetic lines of induction shown and described in U.S. Pat. No. 4,584,707 to Goldberg et al. Thus, the particular manner in which the messages are electrically transmitted and received is not vital to the present invention and should not be considered as limited to that specifically described herein. Rather, the type of information contained within such messages, which limits communication only to between first and second units 14 and 16, is the primary focus of alerting system 12.

Figure 5:
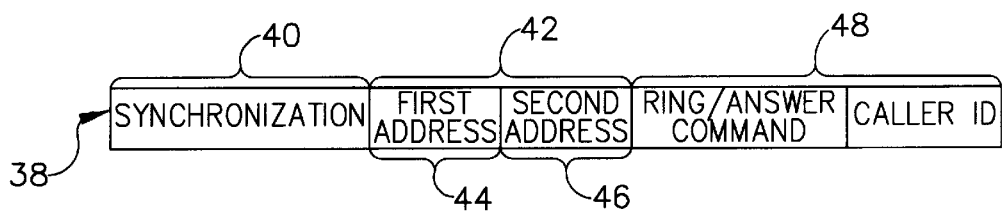
FIG. 5 is a schematic diagram of the messages transmitted and received between the first unit and the accessory unit; including the specific fields contained therein.

In this regard, it is seen in FIG. 5 that each message (designated generally by the numeral 38) includes a plurality of specified fields. In particular, each message 38 preferably has a preamble field 40 which contains a synchronization sequence for enabling the link between first unit 14 and accessory unit 16. A header field 42 is provided in each message 38 and preferably includes a first address 44 and a second address 46 to identify the point of origin and the intended point of reception, respectively, thereof With respect to addresses 44 and 46 in header field 42, it will be appreciated that first unit 14 may interrogate accessory unit 16 to determine the identification number (e.g., its serial number or by hashing from such serial number) of accessory unit 16. Alternatively, portable communication device 10 may load its mobile identification number or other suitably unique number into accessory unit 16, such number being loaded at the time of sale of accessory unit 16 or portable communication device 10. In this way, it is ensured that messages 38 are received exclusively by first and second units 14 and 16.

Each message 38 further has a payload field 48 which contains the commands transmitted between first unit 14 and accessory unit 16. Such commands will generally involve a ring command from first unit 14 to accessory unit 16 when an incoming call is received and an answer command from accessory unit 16 to first unit 14, but other information may be optionally included depending on the operations desired by such units. It will be understood that preamble field 40 will typically be a minimum of 64 bits in length, header field 42 will typically be a minimum of 16 bits in length (8 bits each for first and second addresses 44 and 46), and payload field 48 will typically have a minimum of 8 bits available for commands. Of course, any of such fields may be larger to accommodate more elaborate addresses.

It is highly desirable for the source of an incoming call to portable communication device 10 to be identified so that the user may make an informed decision as to how such call should be handled. This can be accomplished in the case where portable communication device 10 is a cellular telephone or other similar device through services typically offered by local providers. In such instance, the source identifying information (known generally as caller ID) is preferably included in payload field 48 during the course of a ring command type message from first unit 14 to accessory unit 16. Accessory unit 16, for its part, will preferably include a display 50 (e.g., a liquid crystal display or the like) upon which the source identifying information may be seen. It will also be understood that payload field 48 will need to be larger in order to accommodate such source identifying information (typically a minimum of 64 bits in length).

Control circuitry 32 of accessory unit 18 may also optionally include memory to store a list of certain source identifying information, wherein the particular source identifying information received for a given incoming call to portable communication device 10 may be compared therewith and automatically dispatched in accordance with predetermined instructions relating thereto. For example, such instructions may include sending the incoming call to a voice mailbox, answering the incoming call, or ignoring the incoming call. At a minimum, it is preferred that control circuitry 32 automatically dispatch the incoming call to a voice mailbox if signaling switch 34 is not activated within a specified time period.

It will be understood that transducer 30 of accessory unit 16 may take one of several forms so that the alerting signal provided is visual, aural, and/or tactile in nature. Since the intention of alerting system 12 is to alert the user of portable communication device 10 when an incoming call is received, and the user may be in any number of environments or circumstances, transducer 30 includes, but is not limited by, such items as a vibrating mechanism, an LED, a ringer, a bell, or the like. Because of the limited effectiveness of visual and aural alerting signals outside of the normal situation, the preferred embodiment of transducer 30 is as a vibrating mechanism.

Further, it is anticipated that portable communication device 10 will include some type of alerting signal which it provides when an incoming call is received. In order to conserve the battery used to provide power to portable communication device 10, as well as to minimize any confusion stemming from several alerting signals being provided, first unit 14 may be utilized to automatically disable such alerting signal of portable communication device 10 when alerting system 12 is powered on. Alternatively, first unit 14 may provide the ability to optionally disable such alerting signal of portable communication device 10.

Figure 6:
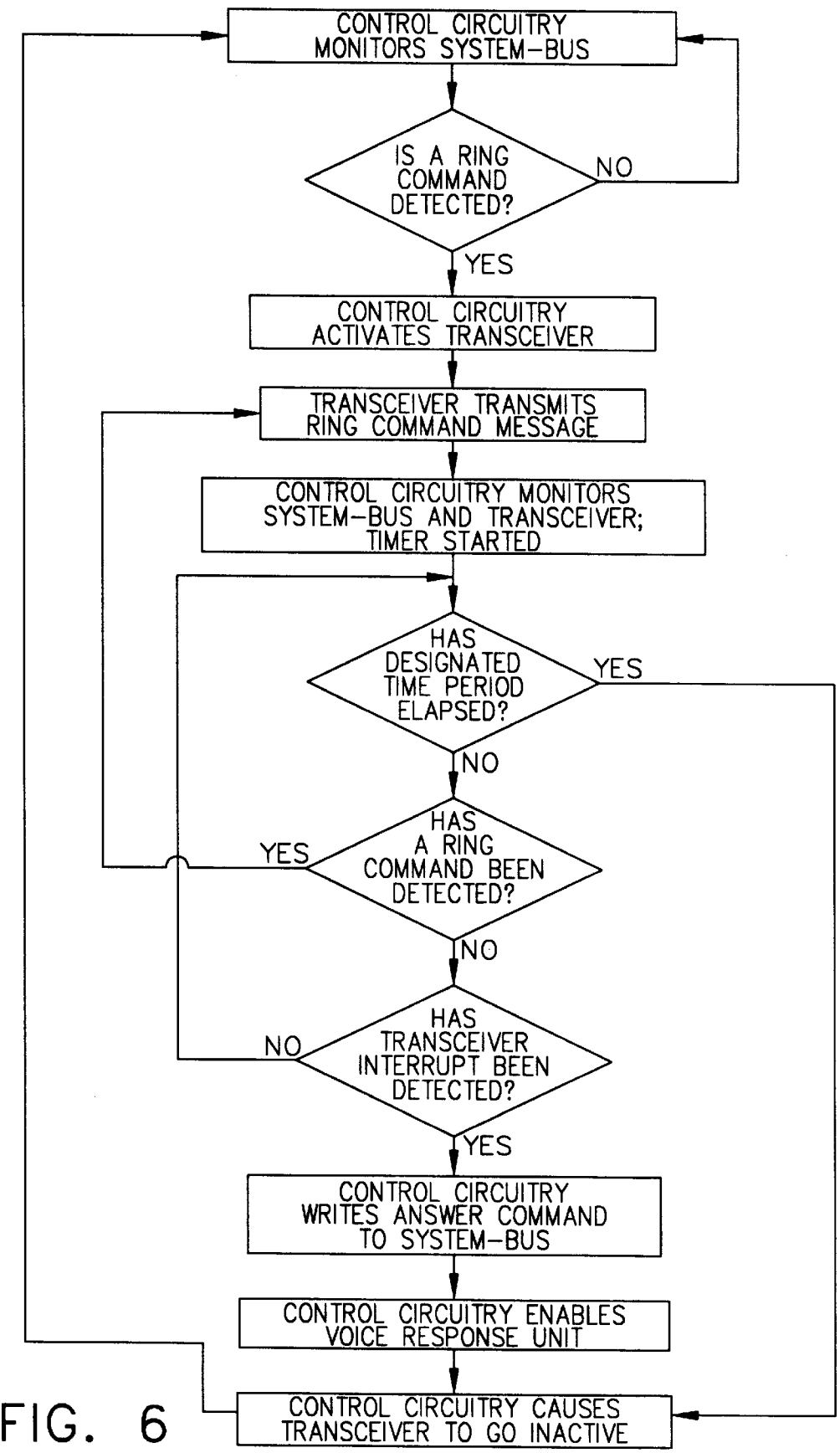
FIG. 6 is a flow diagram of the logic in the control circuitry for the first unit of the alerting system.
Figure 7:
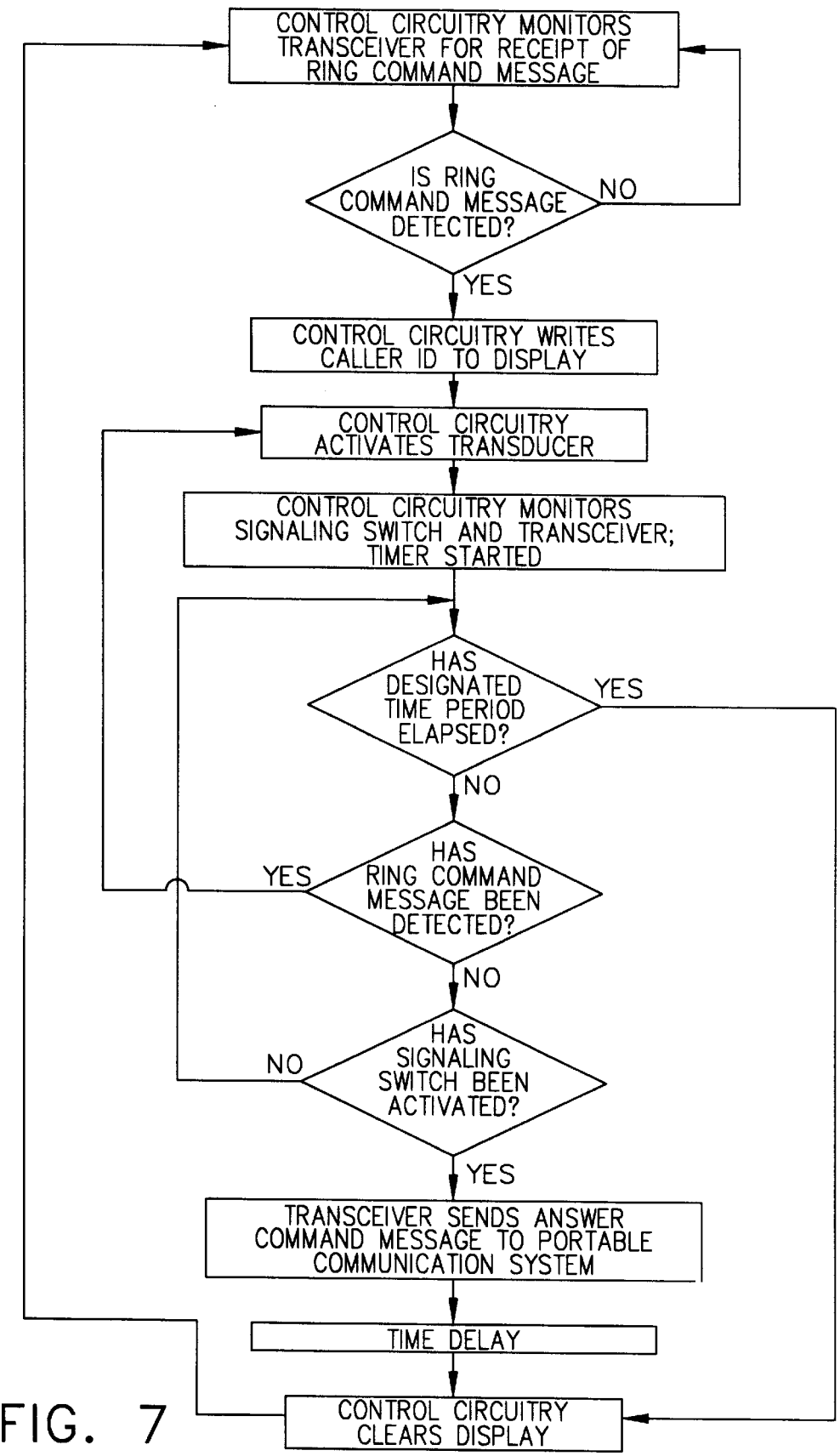
FIG. 7 is a flow diagram of the logic in the control circuitry for the accessory unit of the alerting system.

In order to better understand the operation of first and second units 14 and 16, respectively, the flow charts in FIGS. 6 and 7 are provided and hereby explained. As seen in FIG. 6, control circuitry 24 of first unit 14 continuously monitors the system-bus of portable communication device 10 for a ring command via bus interface 20. Once a ring command for portable communication device 10 is detected, control circuitry 24 activates transceiver 22 and transceiver 22 then sends a ring command message to accessory unit 16 by means of antenna 23. It will be understood that, where available, caller ID or other source identifying information will be appended to the ring command message in payload field 48 thereof After the ring command message has been transmitted, the logic of control circuitry 24 monitors transceiver 22 to determine whether it is interrupted by an answer command message returned by accessory unit 16 in addition to the system-bus for a ring command as above. A timer is also started therein to limit this activity to a designated time period (e.g., 10 seconds). Thus, it will be seen that control circuitry 24 first determines whether that designated time period has elapsed. If the answer is yes, control circuitry 24 causes transceiver 22 to go inactive. If the answer is no, control circuitry 24 then determines whether a ring command has been detected. If the answer is yes, control circuitry 24 causes transceiver 22 to again transmit a ring command message to accessory unit 16. If the answer is no, control circuitry then determines whether an interrupt to transceiver 22 has been detected. Should transceiver 22 receive an answer command message from accessory unit 16, and thereby be interrupted, control circuitry 24 will detect this and write an answer command to the system-bus of portable communication device 10. Control circuitry will also preferably enable voice response unit 36 to play the pre-recorded "stand by" message. Thereafter, control circuitry 24 causes transceiver 22 to go inactive and return to the initial condition of monitoring the system-bus for a ring command.

With respect to accessory unit 16, it will be seen in FIG. 7 that control circuitry 32 thereof monitors transceiver 28 for receipt of a ring command message (via antenna 25) sent by transceiver 22 of first unit 14. After the ring command message is detected, the logic of control circuitry 32 preferably writes the source identifying information of the incoming call (caller ID) to display 50 of accessory unit 16. Control circuitry 32 then activates transducer 30 for a specified time length so that the alerting signal associated therewith is provided.

Control circuitry 32 then monitors whether signaling switch 34 is activated in response to the alerting signal, wherein an interrupt is sent to transceiver 28 for transmission to first unit 14 upon detection thereof This is in addition to control circuitry 32 continuing to monitor transceiver 28 for a ring command message. Further, a timer is started therein to measure the length of time taken before one of these actions occurs. Accordingly, control circuitry 32 first determines whether the designated time period (e.g., approximately 10 seconds) has elapsed. If it has, control circuitry 32 causes display 50 to be cleared and returns to monitoring transceiver 28. If the time period has not elapsed, control circuitry 32 determines whether a ring command message has been detected. If so, it causes transducer 30 to again be activated for another alerting signal. If not, control circuitry 32 determines whether signaling switch 34 has been activated. If signaling switch 34 has been activated, transceiver 28 sends the answer command message to first unit 14 so that control circuitry 24 therein is able to direct the incoming call. Otherwise, it starts again with determining if the designated time period has elapsed. After sending the answer command message, the logic of control circuitry 32 undergoes a time delay and clears display 50 of accessory unit 16. Control circuitry 32 returns to monitoring transceiver 28 for receipt of a ring command message from first unit 14.

Having shown and described the preferred embodiment of the present invention, further adaptations of the incoming call alert system for a portable communication device can be accomplished by appropriate modifications by one of ordinary skill in the art without departing from the scope of the invention. In particular, it will be understood that more than one accessory unit 16 may be linked to a single first unit 14 electrically connected to a portable communication device, whereby more than one user thereof may be alerted of an incoming call.

What is claimed is:

1. An incoming call alert system for use with a portable communication device, comprising:
   (a) an accessory unit physically separate from said portable communication device for providing an alerting signal;
   (b) a wireless link between said portable communication device and said accessory unit; and
   (c) circuitry electrically connected to operating circuitry of said portable communication device, said circuitry further comprising:
      (1) an interface for maintaining and terminating the electrical connection between said circuitry and said operating circuitry of said portable communication device;
      (2) a transceiver for transmitting messages exclusively to and receiving messages exclusively from said accessory unit over said wireless link;
      (3) control logic for monitoring receipt of an incoming call by said portable communication device and activating said transceiver to send a message in response thereto, said message causing said accessory unit to activate said alerting signal; and
      (4) a voice response unit for playing a pre-recorded message upon activation by a message from said accessory unit.

2. The incoming call alert system of claim 1, said accessory unit further comprising:
   (a) a power source;
   (b) a transceiver for receiving messages exclusively from and transmitting messages exclusively to said circuitry over said wireless link;
   (c) a transducer whcih provides said alerting signal upon activation; and
   (d) control circuitry for activating said transducer upon receipt of said message by said accessory ubit transceiver via said wireless link.

3. The incoming call alert system of claim 2, said accessory unit further comprising a signaling switch for causing said accessory unit transceiver to transmit said message to said voice response unit.

4. The incoming call alert system of claim 3, wherein said control circuitry automatically dispatches said incoming call to a voice mailbox if said signaling switch is not activated within a predetermined time period.

5. The incoming call alert system of claim 1, wherein said alerting signal is visual.

6. The incoming call alert system of claim 1, wherein said alerting signal is aural.

7. The incoming call alert system of claim 1, wherein said alerting signal is tactile.

8. The incoming call alert system of claim 1, wherein an alerting signal provided by said portable communication device is optionally disabled when said accessory unit is powered on.

9. The incoming call alert system of claim 1, wherein said portable communication device is among a class including a cellular phone, a radio terminal, a personal communication system terminal, a satellite phone, a pager, a cordless telephone, a portable computer with a PCCMIA card, and a wireless-PBX terminal.

10. The incoming call alert system of claim 1, wherein said circuitry is housed within an expansion unit separately attachable to said portable communication device.

11. The incoming call alert system of claim 1, wherein said circuitry is integrated into a battery pack used to power said portable communication device.

12. The incoming call alert system of claim 1, wherein said circuitry is integrated into said operating circuitry of said portable communication device.

13. An incoming call alert system for use with a portable communication device, comprising:
  (a) an accessory unit physically separate from said portable communication device for providing an alerting signal, said accessory twit further comprising:
    (1) a power source;
    (2) a transceiver for receiving messages exclusively from and transmitting messages exclusively to a circuitry over a wireless link;
    (3) a transducer which provides said alerting signal upon activation; and
    (4) control circuitry for activating said transducer upon receipt of said message by said accessory unit transceiver via said wireless link; and
    (5) a display;
  (b) a wireless link between said portable communication device and said accessory unit;
  (c) a circuitry electrically connected to operating circuitry of said portable communication device, said circuitry further comprising:
    (1) an interface for maintaining and terminating the electrical connection between said circuitry and said operating circuitry of said portable communication device;
    (2) a transceiver for transmitting messages exclusively to and receiving messages exclusively from said accessory unit over said wireless link;
    (3) control logic for monitoring receipt of an incoming call by said portable communication device and activating said transceiver to send a message in response thereto, said message causing said accessory unit to activate said alerting signal; and
  (d) a control for each of said transceivers, wherein messages sent over said wireless link by said circuitry and said accessory unit contain certain information within specified fields, each of said messages further comprising:
    (1) a preamble field containing a synchronization sequence;
    (2) a header field containing an address identifying its intended point of reception; and
    (3) a payload field containing a command transmitted between said circuitry and said accessory unit, said payload field containing information which identifies a source of said incoming call;
wherein said control circuitry of said accessory unit compares said source identifying information to certain stored source identifying information and automatically dispatches said incoming call in accordance with predetermined instructions related thereto.

14. An incoming call alert system for use with a portable communication device, comprising:
  (a) an accessory unit physically separate from said portable communication device for providing an alerting signal;
  (b) a wireless link between said portable communication device and said accessory unit; and
  (c) circuitry electrically connected to operating circuitry of said portable communication device, said circuitry further comprising:
    (1) an interface for maintaining and terminating the electrical connection communication device;
    (2) a transceiver for transmitting messages exclusively to and receiving messages exclusively from said accessory unit over said wireless link; and
    (3) control logic for monitoring receipt of an incoming call by said portable communication device and activating said transceiver to send a message in response thereto, said message causing said accessory unit to activate said alerting signal;
wherein an alerting signal provided by said portable communication device is automatically disabled when said accessory unit is powered on.

15. An incoming call alert system for use with a portable communication device, comprising:
  (a) at least one accessory unit physically separate from said portable communication device for providing an alerting signal;
  (b) a wireless link between said portable communication device and each said accessory unit; and
  (c) circuitry electrically connected to operating circuitry of said portable communication device, said circuitry further comprising:
    (1) an interface for maintaining and terminating the electrical connection between said circuitry and said operating circuitry of said portable communication device;
    (2) a transceiver for transmitting messages exclusively to and receiving messages exclusively from each said accessory unit over said wireless link;
    (3) control logic for monitoring receipt of an incoming call by said portable communication device and activating said transceiver to send a message in response thereto, said message causing each said accessory unit to activate said alerting signal; and
    (4) a voice response unit for plating a pre-recorded message upon activation by a message from each said accessory unit.

16. An incoming call alert system for use with a cellular telephone, comprising:
  (a) a first unit electrically connected to a system-bus connector of said cellular telephone, said first unit further comprising:
    (1) an interface for maintaining and terminating the electrical connection between said first unit and said system-bus connector of said cellular telephone;
    (2) a transceiver for transmitting and receiving messages over a wireless link exclusively to and from a second unit;

(3) control logic for monitoring receipt of an incoming call by said cellular telephone and activating said transceiver to transmit a ring command message in response thereto; and (4) a voice response unit for playing a pre-recorded message upon activation by a message from said second unit; and (b) a second unit located within a housing distinct from said cellular telephone, said second unit further comprising:

(1) a power source;

(2) a transceiver for receiving and transmitting messages from and to said first unit over said wireless link;

(3) a transducer which provides said alerting signal upon activation;

(4) control circuitry for activating said transducer upon receipt of said ring command message from said first unit transceiver via said wireless link; and (5) a signaling switch for causing said second unit transceiver to transmit said message to said voice response unit.

17. The incoming call alert system of claim 16, wherein said first unit is an expansion unit separately attachable to said portable communication device.

18. The incoming call alert system of claim 16, wherein said first unit is a battery pack used to power said portable communication device.

19. The incoming call alert system of claim 16, wherein said transducer is a vibrating mechanism and said alerting signal is tactile in nature.

20. The incoming call alert system of claim 16, wherein said wireless link is an RF system operating at greater than 2.0 GHz.

21. An accessory unit for use with a portable communication device, comprising:

(a) a power source;

(b) a wireless link with said portable communication device;

(c) a transceiver for receiving a ring command message specifically addressed to said accessory unit from said portable communication device and transmitting a responsive answer message specifically addressed to said portable communication device over said wireless link;

(d) a transducer for providing an alerting signal;

(e) a signaling switch for activating a voice response unit to play a pre-recorded message; and (f) control circuitry for activating said transducer upon receipt of said ring command message by said transceiver and for transmitting said answer message upon activation of said signaling switch.

22. The accessory unit of claim 21, wherein said voice response unit is located within said portable communication device.

23. The accessory unit of claim 21, wherein said voice response unit is located within said accessory unit and said pre-recorded message is transmitted via said wireless link to said portable communication device.

24. The accessory unit of claim 21, wherein said alerting signal is visual.

25. The accessory unit of claim 21, wherein said alerting signal is aural.

26. The accessory unit of claim 21, wherein said alerting signal is tactile.

27. An accessory unit for use with a portable communication device, comprising:

(a) a power source;

(b) a wireless link with said portable communication device;

(c) a transceiver for receiving a ring command message specifically addressed to said accessory unit from said portable communication device and transmitting a responsive answer message specifically addressed to said portable communication device over said wireless link;

(d) a transducer for providing an alerting signal;

(e) a signaling switch;

(f) a display to show information identifying a source of an incoming call to said portable communication device upon receipt of said information from said portable communication device; and (f) control circuitry for activating said transducer upon receipt of said ring command message by said transceiver and for transmitting said answer message upon activation of said signaling switch;

wherein said control circuitry of said accessory unit compares said source identifying information to certain stored source identifying information and automatically dispatches said incoming call in accordance with predetermined instructions relating thereto.

28. The accessory unit of claim 27, wherein said control circuitry automatically dispatches said incoming call to a voice mailbox if said signaling switch is not activated within a predetermined time period.

* * * * *

UNITED STATES PATENT AND TRADEMARK OFFICE
CERTIFICATE OF CORRECTION

PATENT NO : 6,119,022
DATED : September 12, 2000
INVENTOR(S): William Richard Osborn et al.

It is certified that error appears in the above-identified patent and that said Letters Patent are hereby corrected as shown below:

In column 8, line 55, claim 2, delete [whcih] and insert which.

In column 8, line 58, claim 2, delete [ubit] and insert unit.

In column 9, line 30, claim 13, delete [twit] and insert unit.

In column 9, line 43, claim 13, delete [a] and insert said.

In column 10, line 53, claim 15, delete [plating] and insert playing.

Signed and Sealed this

Twenty-fourth Day of April, 2001

Attest:

NICHOLAS P. GODICI

Attesting Officer     Acting Director of the United States Patent and Trademark Office